United States Patent
Lee et al.

(10) Patent No.: US 12,026,836 B2
(45) Date of Patent: Jul. 2, 2024

(54) METHOD AND APPARATUS FOR SIMULATING CLOTHES

(71) Applicant: CLO Virtual Fashion Inc., Seoul (KR)

(72) Inventors: Hohyun Lee, Seoul (KR); Yeji Kim, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 0 days.

(21) Appl. No.: 17/929,154

(22) Filed: Sep. 1, 2022

(65) Prior Publication Data

US 2023/0044445 A1 Feb. 9, 2023

Related U.S. Application Data

(63) Continuation of application No. 17/027,369, filed on Sep. 21, 2020, now Pat. No. 11,461,967.

(30) Foreign Application Priority Data

Aug. 19, 2019 (KR) .................. 10-2019-0101263
Aug. 19, 2020 (KR) .................. 10-2020-0104061

(51) Int. Cl.
*G06T 17/20* (2006.01)
*A41H 3/00* (2006.01)
(Continued)

(52) U.S. Cl.
CPC .............. *G06T 17/20* (2013.01); *A41H 3/007* (2013.01); *G06T 11/203* (2013.01); *G06T 17/10* (2013.01); *G06T 19/20* (2013.01); *G06T 2210/16* (2013.01)

(58) Field of Classification Search
None
See application file for complete search history.

(56) References Cited

U.S. PATENT DOCUMENTS 5,504,845 A 4/1996 Vecchione
6,462,740 B1 * 10/2002 Immel ............... G06T 19/20
345/473
(Continued)

FOREIGN PATENT DOCUMENTS

JP 2010-271820 A 12/2010
KR 10-1702069 B1 2/2017
WO WO 2010/110053 A1 9/2010

OTHER PUBLICATIONS

Yuki, H., "[Fashion: 3D CLO] Fashion Clo Chapter 15-Shirring & Pleats Dress Drawing," Jun. 19, 2019, 14 pages.
(Continued)

*Primary Examiner* — Andrew G Yang
(74) *Attorney, Agent, or Firm* — WTA Patents

(57) ABSTRACT

A method and apparatus for simulating clothes receive a user setting for an area in which shirring is to be expressed in a two-dimensional (2D) pattern of clothes modeled with a mesh including a plurality of polygons, obtain a first line and a second line parallel to the first line from the area based on the user setting, generate inner lines that are perpendicular to at least one of the first line and the second line of the area between the first line and the second line and that have regular intervals, align polygons included in the area of the 2D pattern based on the inner lines, and perform a draping simulation of three-dimensional (3D) clothes corresponding to the 2D pattern in which the shirring is expressed by the aligned polygons.

16 Claims, 8 Drawing Sheets

(51) Int. Cl.
  *G06T 11/20*   (2006.01)
  *G06T 17/10*   (2006.01)
  *G06T 19/20*   (2011.01)

(56) References Cited

U.S. PATENT DOCUMENTS

| | | | |
|---|---|---|---|
| 8,249,738 B2* | 8/2012 | Lastra | A41H 3/007 |
| | | | 700/132 |
| 2003/0074099 A1* | 4/2003 | Yan | G06T 19/00 |
| | | | 700/132 |
| 2009/0146995 A1 | 6/2009 | Van Bael et al. | |
| 2011/0158555 A1 | 6/2011 | Chang et al. | |
| 2014/0114620 A1 | 4/2014 | Grinspun et al. | |
| 2014/0360030 A1 | 12/2014 | Grove | |
| 2015/0134302 A1 | 5/2015 | Chhugani et al. | |
| 2016/0180562 A1* | 6/2016 | Naware | G06Q 30/0643 |
| | | | 345/428 |
| 2017/0032563 A1* | 2/2017 | Distler | G06T 15/04 |
| 2018/0025539 A1 | 1/2018 | Oh | |
| 2018/0300959 A1 | 10/2018 | Souza et al. | |
| 2019/0130649 A1* | 5/2019 | O'Brien | G06F 30/10 |
| 2022/0361612 A1* | 11/2022 | Park | G06Q 50/04 |

OTHER PUBLICATIONS

United States Office Action, U.S. Appl. No. 17/027,369, Jan. 27, 2022, 15 pages.

United States Office Action, U.S. Appl. No. 17/027,369, Sep. 2, 2021, 13 pages.

\* cited by examiner

METHOD AND APPARATUS FOR SIMULATING CLOTHES

CROSS-REFERENCE TO RELATED APPLICATIONS

This is a continuation of U.S. patent application Ser. No. 17/027,369 filed on Sep. 21, 2020, which claims priority to Republic of Korea Patent Application No. 10-2019-0101263 filed on Aug. 19, 2019, and Republic of Korea Patent Application No. 10-2020-0104061 filed on Aug. 19, 2020, the entire disclosures of which are incorporated herein by reference for all purposes.

BACKGROUND

1. Field of the Invention

One or more example embodiments relate to a method and apparatus for simulating clothes expressing shirring.

2. Description of the Related Art

Clothes appear in three dimensions when worn on a person's body, but they are more in two dimensions because they are actually a combination of pieces of fabric cut according to a two-dimensional (2D) pattern. Because fabric which is a material for clothes is flexible, it may be varied in appearance from moment to moment according to a body shape or motion of a person who wears it. For example, clothes worn on a body may slip down or become wrinkled and folded by gravity, the wind, or collisions with the body.

Shirring is a method of forming fine pleats by sewing several layers at appropriate intervals on fabric and pulling a lower thread, and refers to a technique that is frequently used in fashion accessories such as shoes and bags as well as clothes. When such a shirring technique is used, natural pleats are formed on fabric based on a sewing line because a length of the fabric is longer than a length of the sewing line. However, since only an act of simply sewing long fabric on a short sewing line is generally simulated in a three-dimensional (3D) virtual clothes simulation, pleats of shirring are expressed in an awkward manner, and it is difficult to realize the shape of clothes to be close to a real shape.

The above description has been possessed or acquired by the inventor(s) in the course of conceiving the present invention and is not necessarily an art publicly known before the present application is filed.

SUMMARY

According to an aspect, shirring may be expressed in a position and shape desired by a user in three-dimensional (3D) clothes according to user settings for a shirring area in which shirring is to be expressed, a shirring interval, and a shirring height.

According to another aspect, natural pleat details may be expressed by reducing a mesh size of an area in which shirring is to be expressed.

According to another aspect, by aligning polygons of a mesh along virtual inner lines generated on a two-dimensional (2D) pattern of clothes based on a shirring area set by a user, a shape of clothes intended by shirring may be realized to be close to a real shape.

According to an example embodiment, a method of simulating clothes includes receiving a user setting for an area in which shirring is to be expressed in a 2D pattern of clothes, the 2D pattern being modeled with a mesh including a plurality of polygons, obtaining a first line and a second line parallel to the first line from the area, based on the user setting, generating inner lines that are perpendicular to at least one of the first line and the second line of the area between the first line and the second line and that have regular intervals, aligning polygons included in the area of the 2D pattern based on the inner lines, and performing a draping simulation of 3D clothes corresponding to the 2D pattern in which the shirring is expressed by the aligned polygons.

The receiving of the user setting may include receiving a user selection for a plurality of points corresponding to the area in the 2D pattern.

The receiving of the user setting may include receiving a user setting for the first line in the 2D pattern. The obtaining of the first line and the second line may include generating the second line that is spaced apart by a predetermined distance from the first line and that is parallel to the first line.

The method may further include receiving a user setting for shirring properties including at least one of a first parameter corresponding to a height of the area in the 2D pattern and a second parameter corresponding to an interval of the shirring.

The receiving of the user setting may include receiving a user setting for the first line in the 2D pattern. The obtaining of the first line and the second line may include generating the second line that is spaced apart by the first parameter from the first line and that is parallel to the first line.

The generating of the inner lines may include generating inner lines that are perpendicular to at least one of the first line and the second line of the area between the first line and the second line and that have intervals based on the second parameter.

The aligning of the polygons may include aligning the polygons in the area of the 2D pattern so that one side of each of the polygons coincides with the inner lines.

The performing of the draping simulation of the 3D clothes may include removing the inner lines from the 2D pattern in which the polygons are aligned, and performing the draping simulation of the 3D clothes corresponding to the 2D pattern from which the inner lines are removed.

According to an example embodiment, a method of simulating clothes includes receiving a user setting for a first line in which shirring is to be expressed in a 2D pattern of clothes, the 2D pattern being modeled with a mesh including a plurality of polygons, generating a second line that is spaced apart by a predetermined distance from the first line and that is parallel to the first line, generating inner lines that are perpendicular to the second line between the first line and the second line and that have regular intervals, aligning polygons included in an area in which the shirring is to be expressed in the 2D pattern, based on the inner lines, and performing a draping simulation of 3D clothes corresponding to the 2D pattern in which the shirring is expressed by the aligned polygons.

A non-transitory computer-readable storage medium may store instructions that, when executed by a processor, cause the processor to perform the method.

According to an example embodiment, an apparatus for simulating clothes includes a user interface (UI) configured to receive a user setting for an area in which shirring is to be expressed in a 2D pattern of clothes, the 2D pattern being modeled with a mesh including a plurality of polygons, a processor configured to obtain a first line and a second line parallel to the first line from the area, based on the user setting, to generate inner lines that are perpendicular to at least one of the first line and the second line of the area between the first line and the second line and that have regular intervals, to align polygons included in the area of the 2D pattern based on the inner lines, and to perform a draping simulation of 3D clothes corresponding to the 2D pattern in which the shirring is expressed by the aligned polygons, and an output device configured to output the 3D clothes of which the draping simulation is performed.

The UI may be configured to receive a user selection for a plurality of points corresponding to the area in the 2D pattern.

The UI may be configured to receive a user setting for the first line in the 2D pattern. The processor may be configured to generate the second line that is spaced apart by a predetermined distance from the first line and that is parallel to the first line.

The UI may be configured to receive a user setting for shirring properties including at least one of a first parameter corresponding to a height of the area in the 2D pattern and a second parameter corresponding to an interval of the shirring.

The UI may be configured to receive a user setting for the first line in the 2D pattern. The processor may be configured to generate the second line that is spaced apart by the first parameter from the first line and that is parallel to the first line.

The processor may be configured to generate inner lines that are perpendicular to at least one of the first line and the second line of the area between the first line and the second line and that have intervals based on the second parameter.

The processor may be configured to align the polygons included in the area of the 2D pattern so that one side of each of the polygons coincides with the inner lines.

The processor may be configured to remove the inner lines from the 2D pattern in which the polygons are aligned, and to perform the draping simulation of the 3D clothes corresponding to the 2D pattern from which the inner lines are removed.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
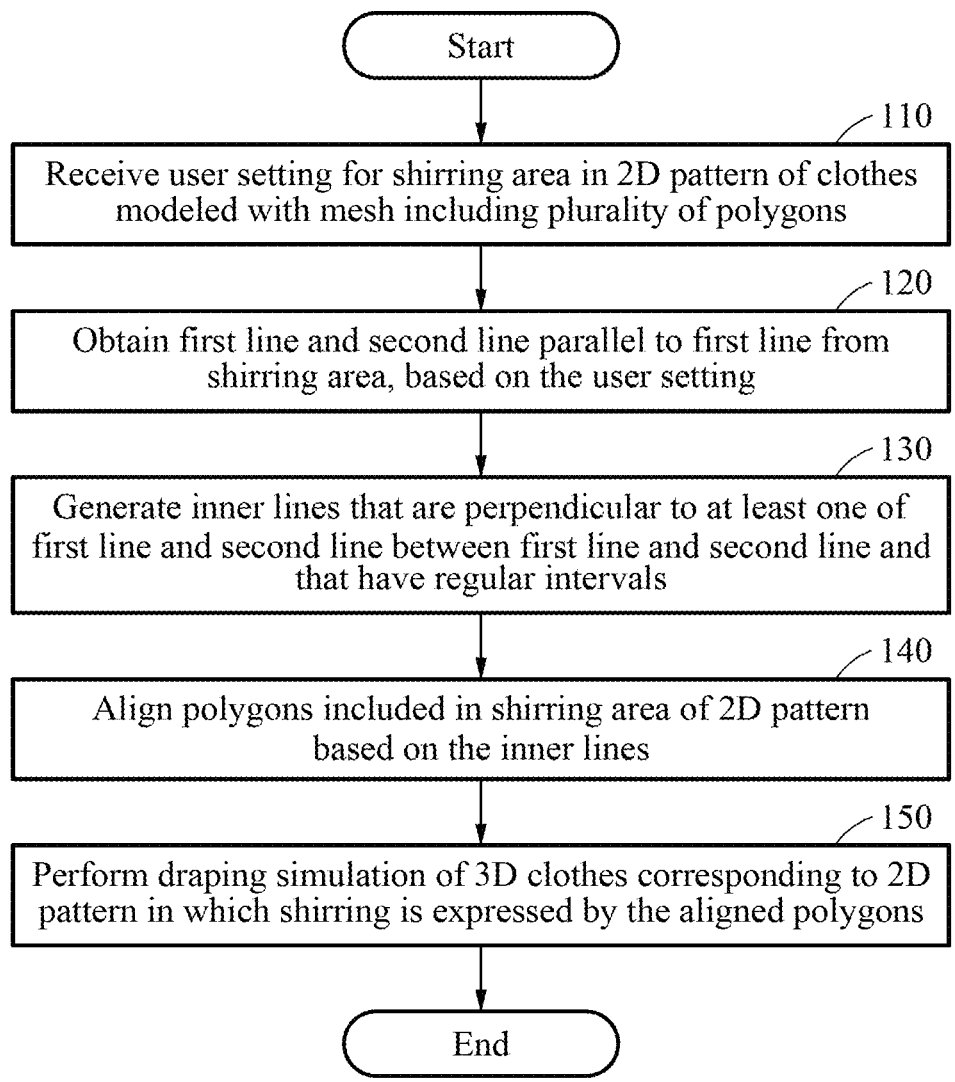
FIG. 1 is a flowchart illustrating an example of a method of simulating clothes according to an example embodiment.

Hereinafter, example embodiments will be described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, description made in one example embodiment may be applicable to another example embodiment and detailed description within a duplicate range is omitted.

FIG. 1 is a flowchart illustrating an example of a method of simulating clothes according to an example embodiment. Referring to FIG. 1, in operation 110, an apparatus for simulating clothes (hereinafter, referred to as a "clothes simulation apparatus") receives a user setting for an area in which shirring is to be expressed in a two-dimensional (2D) pattern of clothes. Here, the clothes may correspond to, for example, three-dimensional (3D) virtual clothes, and may be clothes corresponding to a 2D pattern. The 2D pattern described herein may be a pattern on a 2D plane that is virtually produced virtually by a computer program. The 2D pattern may be, for example, a clothes pattern used to produce clothes a user desires to drape around or over a 3D avatar. The 2D pattern may include pattern pieces corresponding to body parts of the 3D avatar (for example, sleeves, torso (front and back), neck, or legs).

The 2D pattern may be modeled with a mesh including a plurality of polygons, for example, triangles, to simulate the 3D virtual clothes. For example, three vertices of a triangle may be point masses having mass, and sides of the triangle may be represented as springs having elasticity which connects the point masses. Thus, the 2D pattern may be modeled by a mass-spring model, for example. The springs may have respective resistance values against, for example, stretch, shear, and bending, depending on a material property of fabric used. Each vertex may move according to the action of an external force such as gravity, and the action of an internal force such as stretch, shear, and bending. When a force being applied to each vertex is obtained by calculating the external force and the internal force, a speed of a motion and displacement of each vertex may be obtained. Also, a motion of a virtual clothes may be simulated through a motion of vertices of a polygon in each time step. By draping a 2D virtual clothes pattern formed with a mesh over a 3D avatar, it is possible to embody 3D virtual clothes that looks natural based on the laws of physics.

Hereinafter, for convenience of description, the area in which shirring is to be expressed may be briefly referred to as a "shirring area".

For example, in operation 110, the clothes simulation apparatus may receive a user setting for a shirring area in the 2D pattern of the clothes, or may receive a user setting for the shirring area in 3D clothes corresponding to the 2D pattern.

The clothes simulation apparatus may receive a user selection for a specific line(s), a specific area, and/or specific points on the 2D pattern or 3D clothes, and may set a shirring area by the selected line(s), the selected area, and/or the selected points.

In an example, the clothes simulation apparatus may receive a user selection for a plurality of points corresponding to a shirring area in the 2D pattern. In another example, the clothes simulation apparatus may receive a user setting for a first line in the 2D pattern. In this example, the clothes simulation apparatus may generate a second line based on the first line, and may set an area partitioned by the first line and the second line as a shirring area.

In the present specification, the "first line" may correspond to a start line that may implement pleats, that is, shirring in the 2D pattern. The first line may be referred to as a "shirring line". Also, the "second line" may correspond to a distance in which shirring needs to be implemented from the first line in the 2D pattern, and that is, a line indicating a boundary of the shirring area. The second line may also be referred to as a "shirring boundary".

A process by which the clothes simulation apparatus receives the user setting for the shirring area will be further described below with reference to FIGS. 2 and 3.

In operation 110, the clothes simulation apparatus may receive a user setting for shirring properties including at least one of a first parameter corresponding to a height of the shirring area in the 2D pattern and a second parameter corresponding to an interval of shirring. The first parameter may be a value indicating the height of the shirring area in the 2D pattern, and may correspond to, for example, a distance between the first line and the second line.

In operation 120, the clothes simulation apparatus obtains the first line and the second line that is parallel to the first line from the shirring area, based on the user setting received in operation 110. In an example, the clothes simulation apparatus may receive a user setting for the first line in the 2D pattern in the operation 110. In this example, the clothes simulation apparatus may generate and obtain the second line that is spaced apart by a predetermined distance from the first line and that is parallel to the first line in operation 120.

In another example, the clothes simulation apparatus may receive a user setting for shirring properties. In this example, the clothes simulation apparatus may generate the second line that is spaced apart by a distance based on the first parameter from the first line according to the shirring properties and that is parallel to the predetermined distance in operation 120. For example, when the first parameter is set together with the first line in operation 110, the predetermined distance may be determined based on the first parameter. For example, when the first parameter is set to 30 mm, the clothes simulation apparatus may generate a second line that is spaced apart by 30 mm from the first line and that is parallel to the first line.

In operation 130, the clothes simulation apparatus generates inner lines that are perpendicular to at least one of a first line and a second line of the shirring area between the first line and the second line and that have regular intervals. The clothes simulation apparatus may generate inner lines that are perpendicular to at least one of the first line and the second line of the shirring area between the first line and the second line and that have intervals based on the second parameter. For example, when shirring properties (for example, the second parameter) is set together with the first line in operation 110, the intervals may be determined based on the second parameter. For example, when the second parameter is set to 5 mm, the clothes simulation apparatus may generate inner lines that are perpendicular to at least one of a first line and a second line in an area between the first line and the second line in the 2D pattern at intervals of 5 mm.

In operation 140, the clothes simulation apparatus aligns polygons included in the shirring area of the 2D pattern based on the inner lines generated in operation 130. The clothes simulation apparatus may align the polygons included in the shirring area of the 2D pattern so that one side of each of the polygons may coincide with the inner lines. In other words, the clothes simulation apparatus may align the polygons included in the shirring area of the 2D pattern in a direction of shirring, based on the inner lines.

A process by which the clothes simulation apparatus generates the inner lines and aligns the polygons based on the inner lines will be further described below with reference to FIGS. 4 and 5.

In operation 150, the clothes simulation apparatus performs a draping simulation of 3D clothes corresponding to the 2D pattern in which the shirring is expressed by the polygons aligned in operation 140. The term "draping" described herein may be construed as a process of putting 3D clothes on a 3D avatar by combing 2D pattern information or 2D pattern pieces of clothes by a computer program. The clothes simulation apparatus may remove the inner lines from the 2D pattern in which the polygons are aligned. The clothes simulation apparatus may perform a draping simulation of 3D clothes corresponding to the 2D pattern from which the inner lines are removed.

Figure 2:
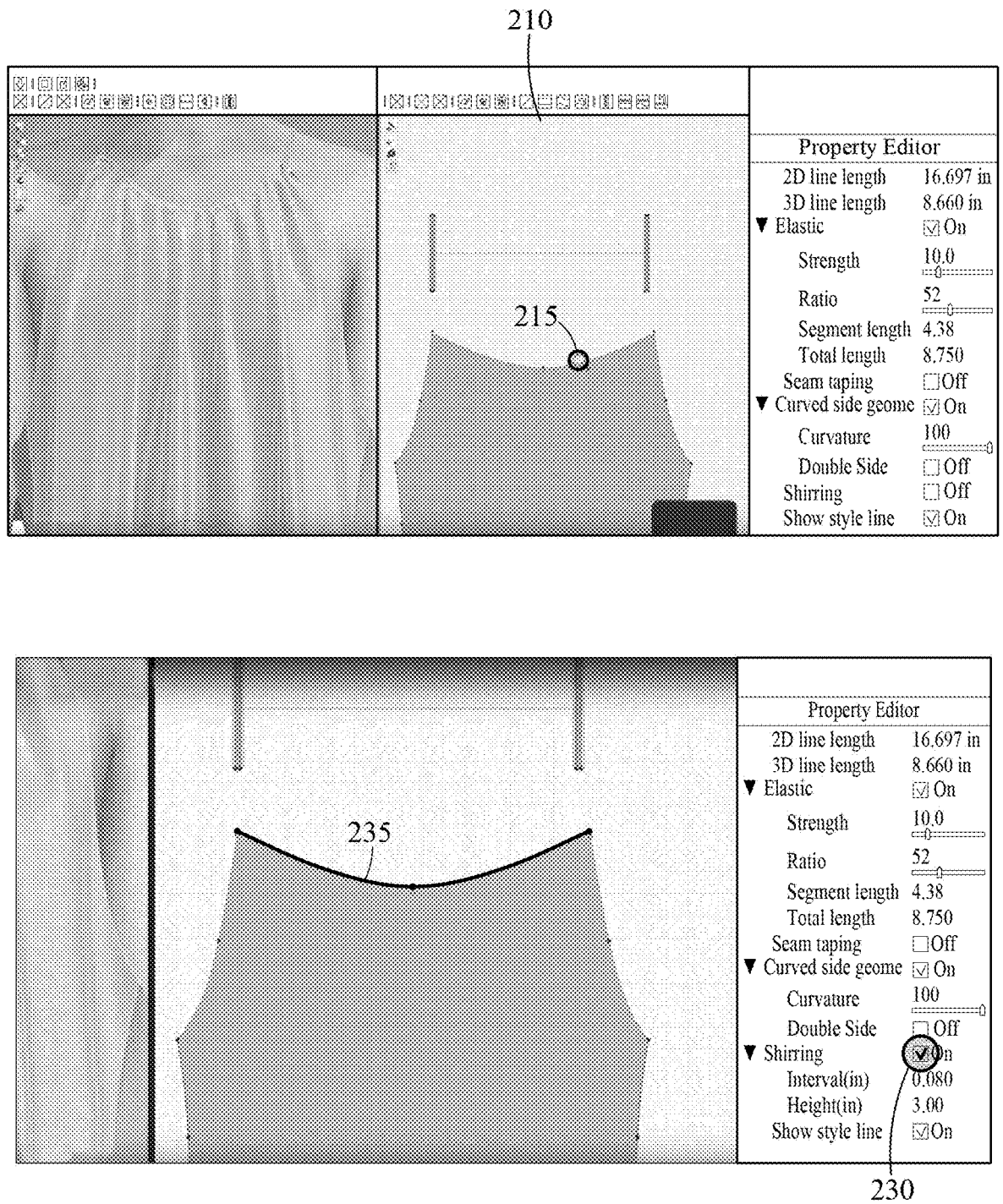
FIG. 2 is a diagram illustrating an example of a method of receiving a user setting for an area in which shirring is to be expressed according to an example embodiment.

FIG. 2 is a diagram illustrating an example of a method of receiving a user setting for a shirring area according to an example embodiment. Referring to FIG. 2, 3D clothes and a 2D pattern 210 corresponding to the 3D clothes are illustrated.

For example, a user is assumed to select the 2D pattern 210 corresponding to the 3D clothes shown in a left side of a top image of FIG. 2. The user may select a "dot/line edit" button on a 2D tool bar on a top of an application screen that displays the 2D pattern 210, and may select a line 215 in which shirring is to be expressed in the 2D pattern 210.

When the line 215 is selected, the user may select "On" in shirring on/off check boxes 230 in a "Property Editor" displayed on a right side of a screen of FIG. 2, and may assign shirring properties to the selected line. The line 215 may be set as a first line 235 by assigning the shirring properties. For example, a shirring symbol may be displayed on the first line 235 with the assigned shirring properties. In this example, the clothes simulation apparatus may generate a second line that is spaced apart by a predetermined distance from the first line 235 and that is parallel to the first line 235, to set a shirring area in the 2D pattern by the first line 235 and the second line.

Figure 4:
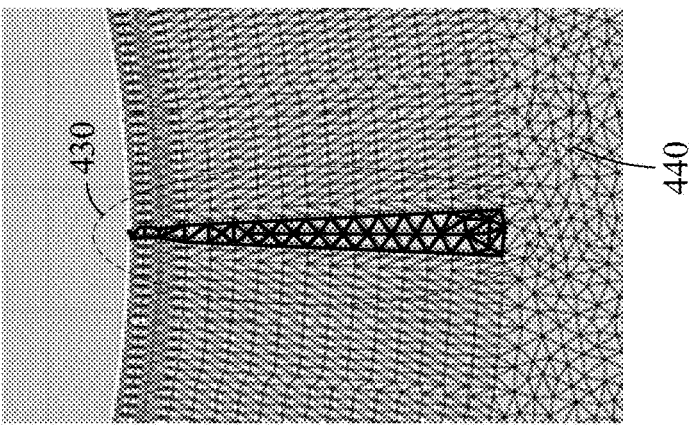
FIG. 4 is a diagram illustrating a method of generating inner lines and aligning polygons based on the inner lines according to an example embodiment.
Figure 4:
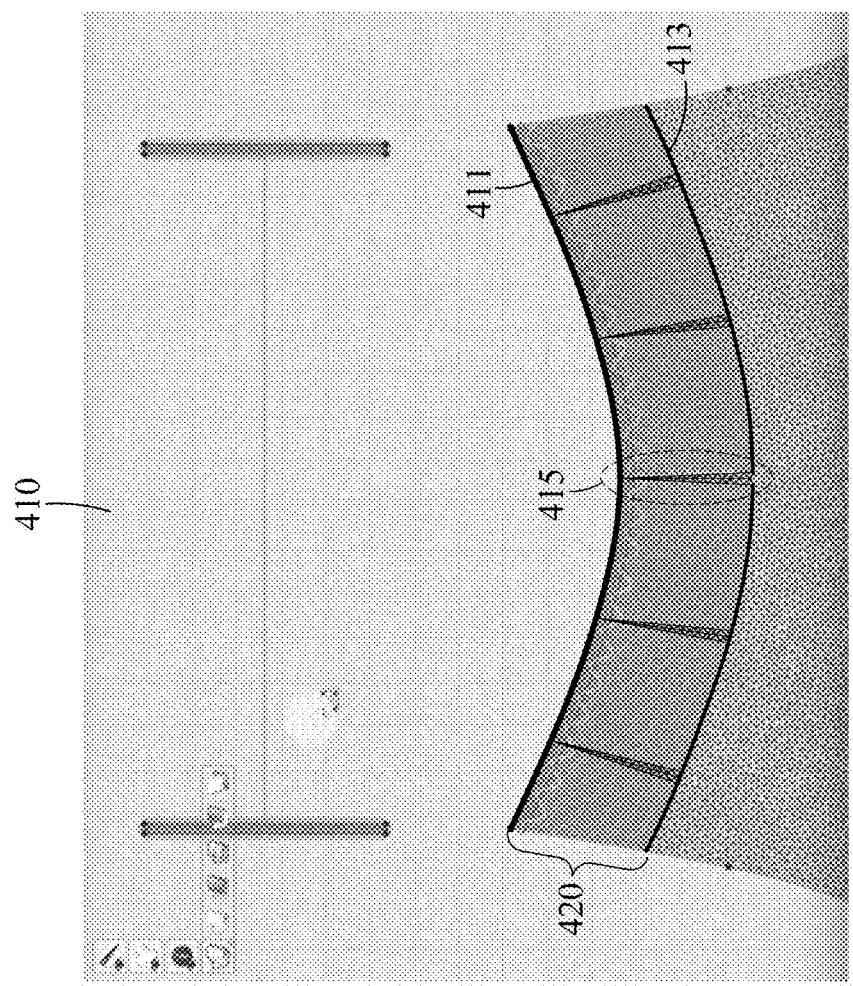
Figure 5:
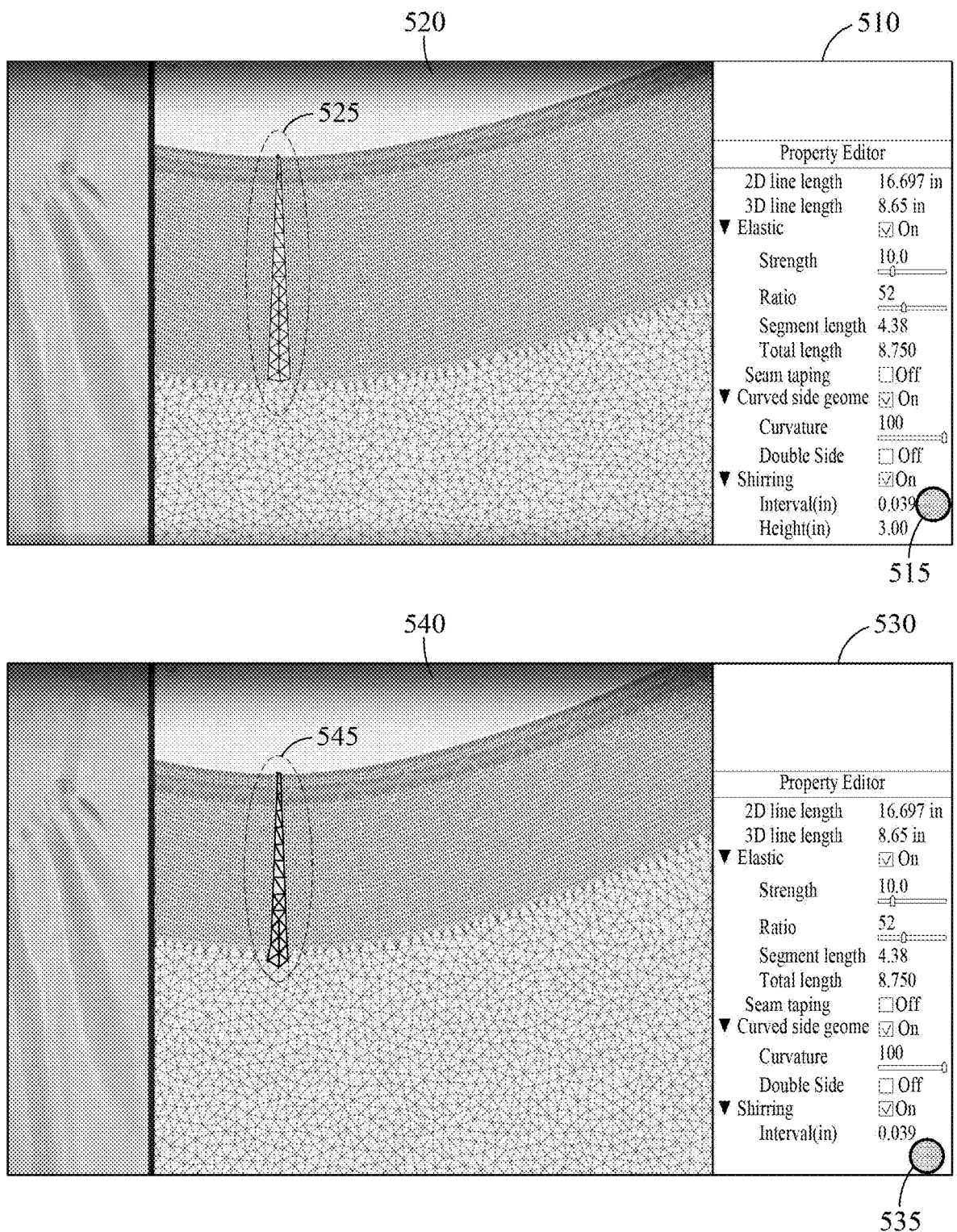
FIG. 5 is a diagram illustrating a two-dimensional (2D) pattern expressing shirring according to an example embodiment.

A result obtained by applying shirring to the 2D pattern 210 according to an example embodiment may be confirmed through viewing 3D clothes or a 2D pattern mesh shown in FIGS. 4 and 5.

Figure 3:
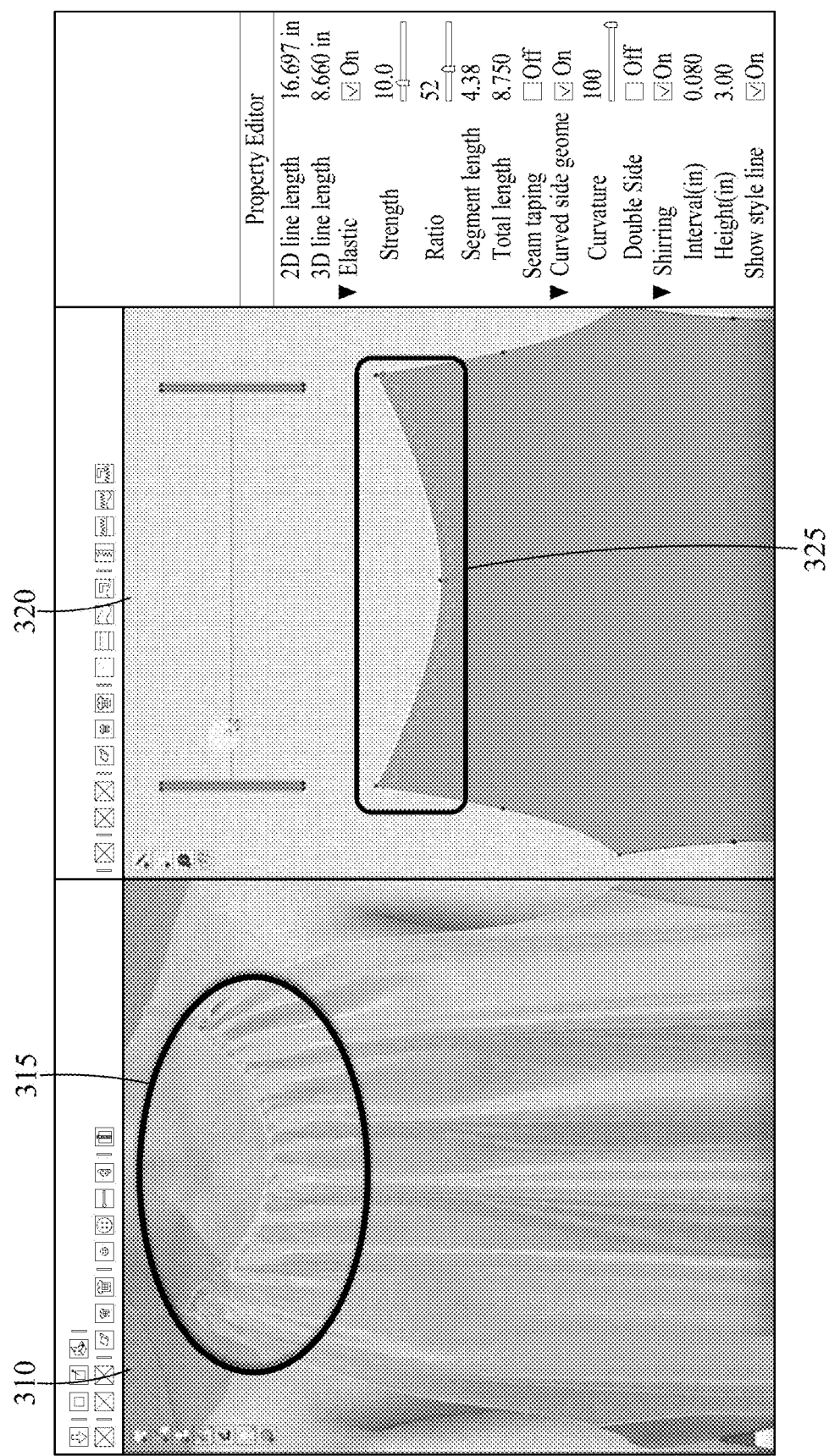
FIG. 3 is a diagram illustrating another example of a method of receiving a user setting for an area in which shirring is to be expressed according to an example embodiment.

FIG. 3 is a diagram illustrating another example of a method of receiving a user setting for a shirring area according to an example embodiment. Referring to FIG. 3, 3D clothes 310 and a 2D pattern 320 corresponding to the 3D clothes 310 are illustrated.

A user may select a shirring area 315 by a selection through a mouse drag or a stylus pen from the 3D clothes 310 displayed on an application screen. When the shirring area 315 is selected from the 3D clothes 310, a clothes simulation apparatus may set a shirring area 325 corresponding to the shirring area 315 in the 2D pattern 320 corresponding to the 3D clothes 310.

Depending on example embodiments, the clothes simulation apparatus may receive a user selection for a plurality of points corresponding to a shirring area in the 2D pattern 320. The clothes simulation apparatus may set an area partitioned by the plurality of points as a shirring area.

FIG. 4 is a diagram illustrating a method of generating inner lines and aligning polygons based on the inner lines according to an example embodiment. Referring to FIG. 4, a result screen showing a result obtained by applying shirring to a 2D pattern according to an example embodiment through a mesh view is illustrated.

When a user sets a shirring area 420 through the process of FIG. 2 or 3 and selects a mesh view button, a 2D pattern 410 with an applied shirring may be displayed on a screen.

For example, a user may set shirring properties such as a height or an interval for shirring through a user interface (UI) displayed on a right side of an application screen of FIG. 4. In this example, the height for shirring may correspond to a height of an area in which shirring (pleats) is to be expressed in the 2D pattern 410, and may refer to the above-described first parameter. Also, the interval for shirring may correspond to an interval of shirring expressed in a shirring area or a period in which meshes are aligned in the 2D pattern 410, and may correspond to the above-described second parameter.

A clothes simulation apparatus may receive user settings for the height and the interval for shirring in the 2D pattern 410, and may set a shirring area 420 based on the user settings. Here, shirring properties of the shirring area 420 may be changed through a user setting.

The clothes simulation apparatus may generate a second line 413 that is spaced apart by the height for shirring (the first parameter) from a first line 411 set in advance in the 2D pattern 410 and that is parallel to the first line 411. Also, the clothes simulation apparatus may generate inner lines 415 that are perpendicular to at least one of the first line 411 and the second line 413 of the shirring area 420 between the first line 411 and the second line 413 and that have intervals for shirring (the second parameter).

The clothes simulation apparatus may align polygons 430 included in the shirring area 420 of the 2D pattern 410 based on the inner lines 415. The clothes simulation apparatus may align the polygons 430 (for example, triangles) in the shirring area 420 of the 2D pattern 410 so that one side of each of the polygons 430 may coincide with inner lines. Polygons that express pleats by sewing may be aligned in a direction of the pleats, and accordingly shirring may be naturally expressed in 3D clothes corresponding to a 2D pattern. Here, polygons in a remaining area 440 obtained by excluding the shirring area 420 from the 2D pattern 410 may not be aligned. Subsequently, the clothes simulation apparatus may remove the inner lines 415 from the 2D pattern 410 in which the polygons 430 are aligned. The clothes simulation apparatus may perform a draping simulation of 3D clothes corresponding to the 2D pattern 410 from which the inner lines 415 are removed.

For example, when a 2D clothes pattern is a symmetry pattern, shirring may also be symmetrically applied. The clothes simulation apparatus may naturally express pleat details by reducing a mesh size of the shirring area 420.

FIG. 5 is a diagram illustrating a 2D pattern expressing shirring according to an example embodiment. Referring to FIG. 5, a screen 520 showing a result obtained by applying shirring to a 2D pattern through a mesh view, and a screen 540 showing a 2D pattern in which properties of shirring are changed are illustrated.

In an example, a user may set shirring properties using a property editor 510 displayed on a right side of a top image of FIG. 5, as indicated by reference numeral 515. A clothes simulation apparatus may align polygons by inserting inner lines 525 automatically based on the set shirring properties as shown in the screen 520, to express shirring in the 2D pattern. In another example, the user may change shirring properties using a property editor 530 displayed on a right side of a bottom image of FIG. 5, as indicated by reference numeral 535. The clothes simulation apparatus may align polygons by inserting inner lines 545 automatically based on the changed shirring properties as shown in the screen 540, to express shirring in the 2D pattern. Based on a change in the shirring properties, a shirring area displayed on the screen 540 may be reduced in comparison to a shirring area displayed on the screen 520.

Figure 6:
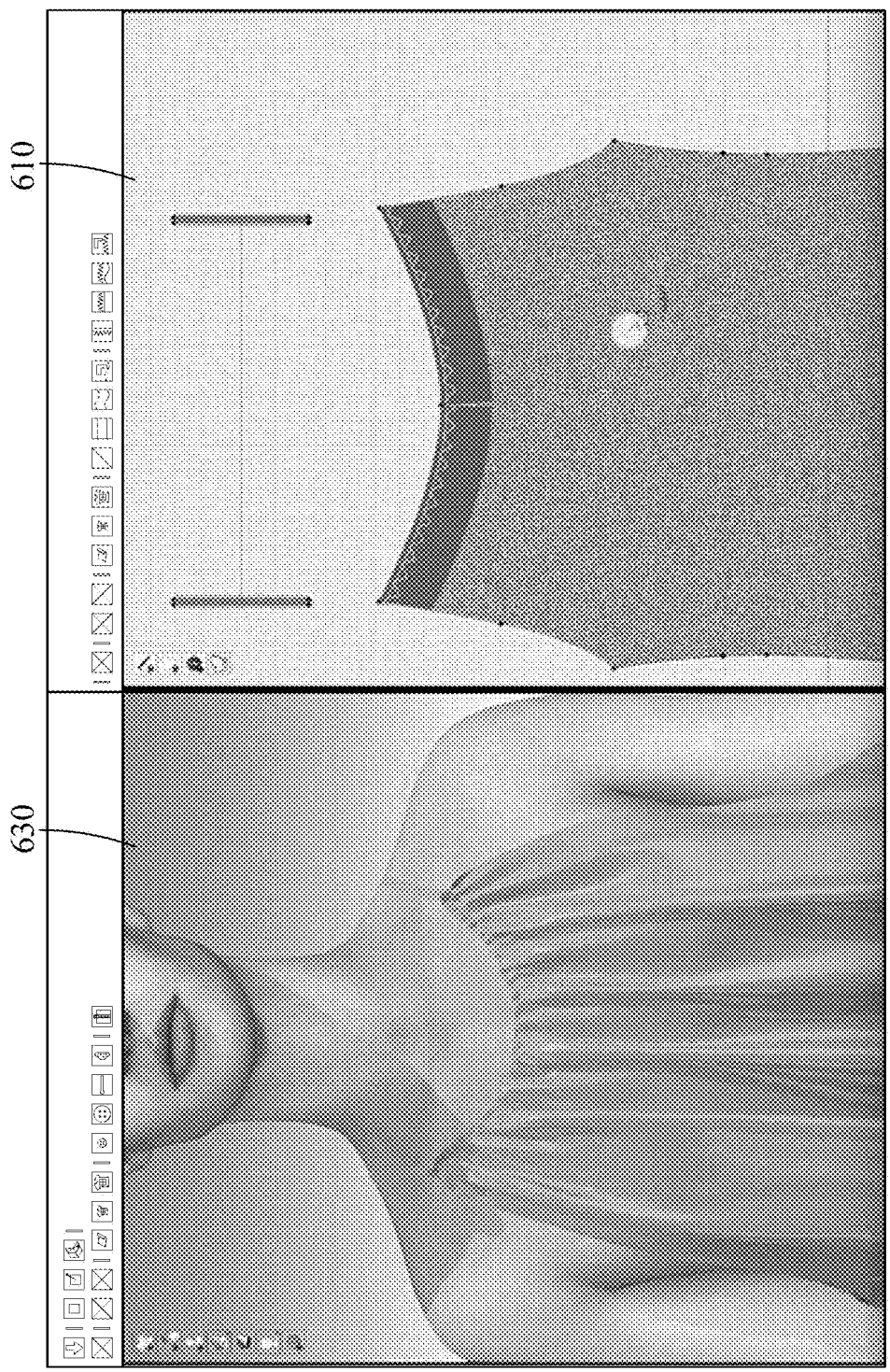
FIG. 6 is a diagram illustrating three-dimensional (3D) clothes simulated corresponding to a 2D pattern expressing shirring according to an example embodiment.

The clothes simulation apparatus may remove inner lines from the 2D pattern in which the polygons are aligned, and may perform a draping simulation of 3D clothes corresponding to the 2D pattern from which the inner lines are removed as shown in FIG. 6 below.

FIG. 6 is a diagram illustrating 3D clothes simulated corresponding to a 2D pattern expressing shirring according to an example embodiment. Referring to FIG. 6, an image 610 that shows a 2D pattern expressing a shirring area, and an image 630 that shows a draping simulation of 3D clothes corresponding to the 2D pattern.

Here, inner lines are removed from the 2D pattern as shown in the image 610.

Figure 7:
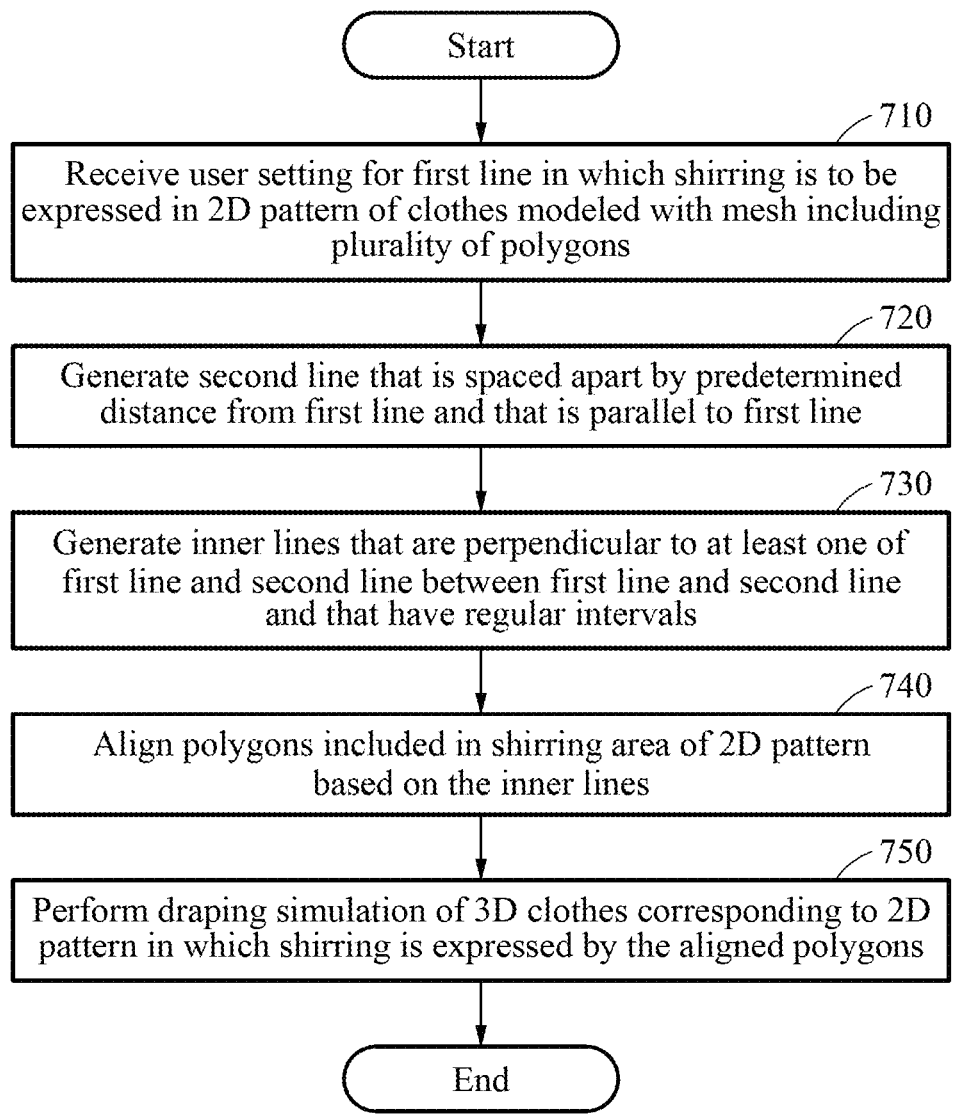
FIG. 7 is a flowchart illustrating another example of a method of simulating clothes according to an example embodiment.

FIG. 7 is a flowchart illustrating another example of a method of simulating clothes according to an example embodiment. Referring to FIG. 7, in operation 710, a clothes simulation apparatus receives a user setting for a first line in which shirring is to be expressed in a 2D pattern of clothes modeled with a mesh including a plurality of polygons. Here, the clothes simulation apparatus may receive a user setting for shirring properties including at least one of a first parameter corresponding to a height of a shirring area in the 2D pattern and a second parameter corresponding to an interval of shirring, in addition to the user setting for the first line.

In operation 720, the clothes simulation apparatus generates a second line that is spaced apart by a predetermined distance from the first line and that is parallel to the first line. When the first parameter is set together with the first line in operation 110, the predetermined distance may be determined based on the first parameter.

In operation 730, the clothes simulation apparatus generates inner lines that are perpendicular to at least one of the first line and the second line between the first line and the second line and that have regular intervals. When the second parameter is set together with the first line in operation 110, the regular intervals may be determined based on the second parameter.

In operation 740, the clothes simulation apparatus align polygons included in the shirring area of the 2D pattern based on the inner lines generated in operation 730.

In operation 750, the clothes simulation apparatus performs a draping simulation of 3D clothes corresponding to the 2D pattern in which shirring is expressed by the polygons aligned in operation 740.

Figure 8:
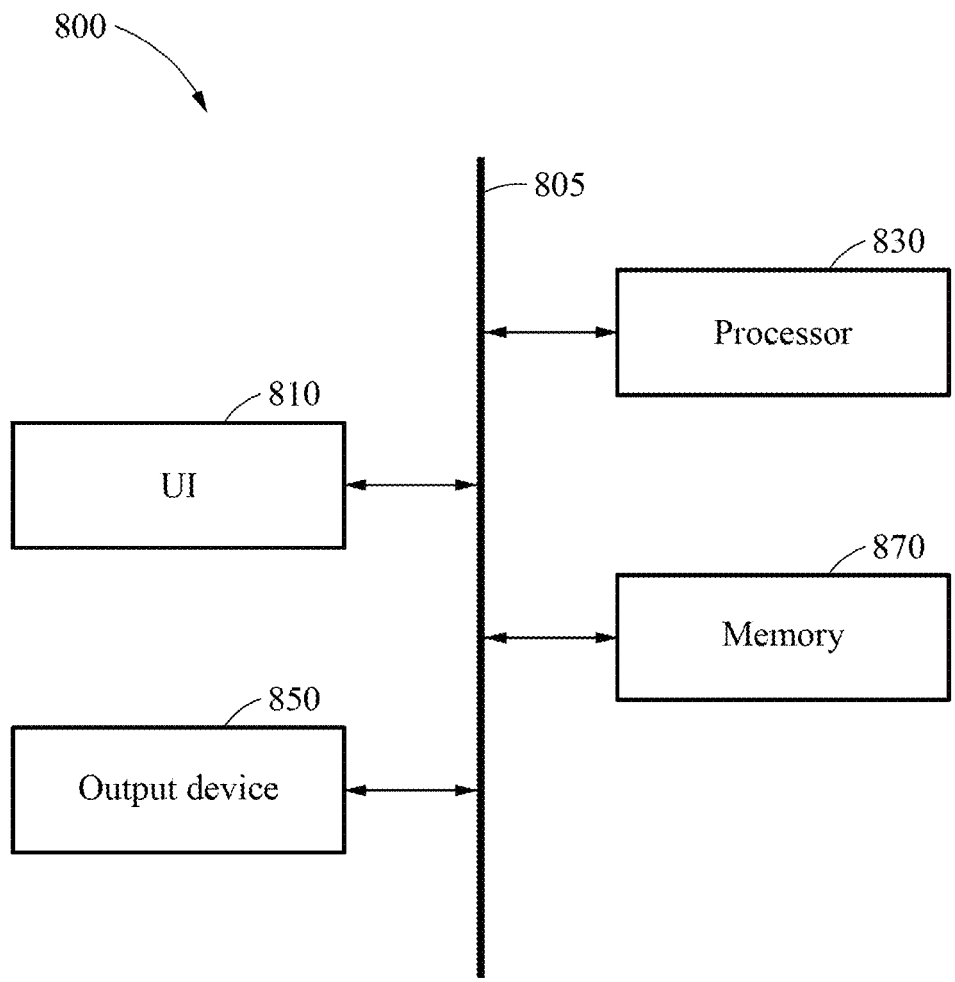
FIG. 8 is a block diagram illustrating an apparatus for simulating clothes according to an example embodiment.

FIG. 8 is a block diagram illustrating a clothes simulation apparatus according to an example embodiment. Referring to FIG. 8, a clothes simulation apparatus 800 includes a UI 810, a processor 830, an output device 850, and a memory 870. The UI 810, the processor 830, the output device 850, and the memory 870 may communicate with each other via a communication bus 805.

The UI 810 may receive a user setting for a shirring area in a 2D pattern of clothes. Here, the 2D pattern may be modeled with a mesh including a plurality of polygons. For example, the UI 810 may receive a user selection for a plurality of points corresponding to the shirring area in the 2D pattern. Also, the UI 810 may receive a user setting for shirring properties including at least one of a first parameter corresponding to a height of a shirring area in which pleats are to be expressed in the 2D pattern and a second parameter corresponding to an interval of shirring. The UI 810 may receive a touch input through, for example, a stylus pen, a mouse, a keyboard, or a touch interface.

The processor 830 may obtain a first line and a second line that is parallel to the first line from the shirring area and, based on the user setting. The processor 830 may generate inner lines that are perpendicular to at least one of the first line and the second line of the shirring area between the first line and the second line and that have regular intervals. In an example, when the UI 810 receives a user setting for the first line in the 2D pattern, the processor 830 may generate the second line that is spaced apart by a predetermined distance from the first line and that is parallel to the first line. In another example, when the UI 810 receives a user setting for shirring properties, the processor 830 may generate the second line that is spaced apart by a distance based on the first parameter included in the shirring properties from the first line and that is parallel to the first line. Also, the processor 830 may generate inner lines that are perpendicular to at least one of the first line and the second line of the shirring area between the first line and the second line and that have intervals based on the second parameter.

The processor 830 may align polygons included in the shirring area of the 2D pattern based on the inner lines. For example, the processor 830 may align the polygons included in the shirring area of the 2D pattern so that one side of each of the polygons may coincide with the inner lines.

The processor 830 may perform a draping simulation of 3D clothes corresponding to the 2D pattern in which shirring is expressed by aligned polygons.

The output device 850 may output the 3D clothes of which the draping simulation is performed by the processor 830. The output device 850 may display, on a screen of a display or an outside of the clothes simulation apparatus 800, the 3D clothes of which the draping simulation is performed and/or a 2D pattern that corresponds to the 3D clothes and from which the inner lines are removed. The output device 850 may be, for example, a display or a communication interface configured to communicate with the outside of the clothes simulation apparatus 800.

Depending on example embodiments, the output device 850 may be a 2D pattern output device configured to output a 2D pattern forming 3D clothes onto a separate output material, for example, paper and fabric.

The memory 870 may store a variety of information generated in a processing operation of the processor 830 described above. Also, the memory 870 may store a variety of data and programs, and the like. The memory 870 may include, for example, a volatile memory or a nonvolatile memory. The memory 870 may include a massive storage medium such as a hard disk to store a variety of data.

In addition, the processor 830 may perform at least one of the methods described above with reference to FIGS. 1 through 7 or an algorithm corresponding to at least one of the methods. The processor 830 may be a hardware-implemented data processing device having a circuit that is physically structured to execute desired operations. For example, the desired operations may include code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 830 may execute a program and may control the clothes simulation apparatus 800. Codes of the program executed by the processor 830 may be stored in the memory 870. The processor 830 may be implemented as, for example, a CPU, a graphics processing unit (GPU), or a neural network processing unit (NPU).

According to example embodiments, it is possible to express shirring in a position and shape desired by a user in 3D clothes according to user settings for a shirring area, a shirring interval, and a shirring height.

According to example embodiments, it is possible to express natural pleat details by reducing a mesh size of a shirring area.

According to example embodiments, by aligning polygons of a mesh along virtual inner lines generated on a 2D pattern of clothes based on a shirring area set by a user, it is possible to realize a shape of clothes intended by shirring to be close to a real shape.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of simulating clothes, the method comprising:
   receiving a user input for an area present in a virtual clothes and in which shirring is to be expressed, the virtual clothes being modeled with a mesh comprising a plurality of polygons;
   obtaining the area where a configuration of a portion of the mesh is to be updated;
   generating inner lines in the area based on at least one of a direction and an interval of the shirring;
   updating the configuration of the portion of the mesh in the area to align polygons included in the portion of the mesh so that one side of each of the polygons coincides with the inner lines; and
   performing a draping simulation of the virtual clothes to express the shirring in the area based on the updated configuration of the portion of the mesh.

2. The method of claim 1, wherein the receiving of the user input comprises receiving a user selection for a plurality of points corresponding to the area in the virtual clothes.

3. The method of claim 1, wherein
   the receiving of the user input comprises receiving a user setting for a first line of the at least one line in the virtual clothes, and
   the obtaining the area comprises generating a second line of the at least one line that is spaced apart by a predetermined distance from the first line and that is parallel to the first line.

4. The method of claim 1, further comprising:
   receiving a user input for shirring properties comprising at least one of a first parameter corresponding to a height of the area in the virtual clothes and a second parameter corresponding to an interval of the shirring.

5. The method of claim 4, wherein
   the receiving of the user input comprises receiving a user setting for the at least one line in the virtual clothes, and
   the obtaining the area comprises generating a second line that is spaced apart by the first parameter from a first line and that is parallel to the first line.

6. The method of claim 5, wherein the inner lines is perpendicular to at least one of the first line and the second line of the area between the first line and the second line and that have intervals based on the second parameter.

7. The method of claim 1, wherein the performing of the draping simulation of the virtual clothes comprises:
   removing the inner lines from the virtual clothes in which the polygons are aligned; and
   performing the draping simulation of the virtual clothes from which the inner lines are removed.

8. A method of simulating clothes, the method comprising:
   receiving a user input for a first line in a virtual clothes, the virtual clothes being modeled with a mesh comprising a plurality of polygons;
   generating a second line that is spaced apart by a predetermined distance from the first line and that is parallel to the first line, the first line and the second line outlining an area present in the virtual clothes and where a configuration of a portion of the mesh is to be updated;

generating inner lines at least a subset of which extends from a point on at least one of the first line or the second line outlining the area based on at least one of a direction and an interval of shirring;

updating the configuration of the portion of the mesh in the area to align polygons in the portion of the mesh so that one side of each of the polygons coincides with the inner lines, the shirring to be expressed in the area; and performing a draping simulation of the virtual clothes to express the shirring in the area based on the updated configuration of the portion of the mesh.

9. A non-transitory computer-readable storage medium storing instructions thereon, the instructions, when executed by a processor, cause the processor to:

receive a user input for an area present in a virtual clothes and in which shirring is to be expressed, the virtual clothes being modeled with a mesh comprising a plurality of polygons;

obtain the area where a configuration of a portion of the mesh is to be updated;

generate inner lines in the area based on at least one of a direction and an interval of the shirring;

update the configuration of the portion of the mesh in the area to align polygons included in the portion of the mesh so that one side of each of the polygons coincides with the inner lines; and perform a draping simulation of the virtual clothes to express the shirring in the area based on the updated configuration of the portion of the mesh.

10. An apparatus for simulating clothes, the apparatus comprising:

a user interface (UI) configured to receive a user input for an area present in a virtual clothes and in which shirring is to be expressed, the virtual clothes being modeled with a mesh comprising a plurality of polygons;

a processor configured to:
obtain the area, based on the user input, where a configuration of a portion of the mesh is to be updated,
generate inner lines in the area based on at least one of a direction and an interval of the shirring,
update the configuration of the portion of the mesh in the area to align polygons included in the portion of the mesh so that one side of each of the polygons coincides with the inner lines, and
perform a draping simulation of the virtual clothes to express the shirring in the area based on the updated configuration of the portion of the mesh; and an output device configured to output the virtual clothes of which the draping simulation is performed.

11. The apparatus of claim 10, wherein the UI is configured to receive a user selection for a plurality of points corresponding to the area in the virtual clothes.

12. The apparatus of claim 10, wherein
the UI is configured to receive a user input for a first line in the virtual clothes, and
the processor is configured to generate a second line that is spaced apart by a predetermined distance from the first line and that is parallel to the first line.

13. The apparatus of claim 10, wherein the UI is configured to receive a user input for shirring properties comprising at least one of a first parameter corresponding to a height of the area in virtual clothes and a second parameter corresponding to an interval of the shirring.

14. The apparatus of claim 13, wherein
the UI is configured to receive a user input for a first line in the virtual clothes, and
the processor is configured to generate a second line that is spaced apart by the first parameter from the first line and that is parallel to the first line.

15. The apparatus of claim 13, wherein the inner lines is perpendicular to at least one of a first line and a second line of the area between the first line and the second line and that have intervals based on the second parameter.

16. The apparatus of claim 10, wherein the processor is configured to remove the inner lines from the virtual clothes in which the polygons are aligned, and to perform the draping simulation of the virtual clothes from which the inner lines are removed.

* * * * *